(12) United States Patent
Halonen et al.

(10) Patent No.: US 7,003,457 B2
(45) Date of Patent: Feb. 21, 2006

(54) METHOD AND SYSTEM FOR TEXT EDITING IN HAND-HELD ELECTRONIC DEVICE

(75) Inventors: Katriina Halonen, Vesilahti (FI); Sailesh Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 27 days.

(21) Appl. No.: 10/284,997

(22) Filed: Oct. 29, 2002

(65) Prior Publication Data

US 2004/0083109 A1 Apr. 29, 2004

(51) Int. Cl.
*G10L 15/26* (2006.01)
(52) U.S. Cl. ...................... 704/235; 704/275
(58) Field of Classification Search ............... 704/235, 704/251, 257, 270, 270.1, 9, 10, 276, 278
See application file for complete search history.

(56) References Cited

U.S. PATENT DOCUMENTS

| | | | | |
|---|---|---|---|---|
| 5,875,448 A | * | 2/1999 | Boys et al. | 715/531 |
| 6,301,560 B1 | | 10/2001 | Masters | 704/251 |
| 6,360,201 B1 | * | 3/2002 | Lewis et al. | 704/251 |
| 6,487,534 B1 | * | 11/2002 | Thelen et al. | 704/270 |
| 6,665,639 B1 | * | 12/2003 | Mozer et al. | 704/244 |

FOREIGN PATENT DOCUMENTS

WO WO 00/58942 A2 * 10/2000

OTHER PUBLICATIONS

PR Newswire; Voice signal technologies demonstrates large-vocabulary speech recognition solution for handheld devices; Pag 9164; PR Newswire, London, Sep. 6, 2001; Voice Signal Technologies.*

* cited by examiner

*Primary Examiner*—Abul K. Azad
(74) *Attorney, Agent, or Firm*—Ware, Fressola, Van Der Sluys & Adolphson LLP

(57) ABSTRACT

A dynamically generated small grammar is used for text editing using voice commands in a hand-held electronic device where memory requirements do not allow a large grammar to be used. However, the text is dictated using a large grammar, which can reside in the electronic device or in a remote site. When an editing session begins, words in the dictated text are added to the small grammar. As such, words to be deleted or replaced can be located, for example. When a voice command calls for a text-modifying word, the text-modifying word is obtained from the small grammar if possible. Otherwise it is obtained from the large grammar. During the editing session, as more text-modifying words are used to modify the text, these words are also added to the small grammar. At the end of the editing session, the dynamically generated part of the small grammar is removed.

30 Claims, 6 Drawing Sheets

METHOD AND SYSTEM FOR TEXT EDITING IN HAND-HELD ELECTRONIC DEVICE

FIELD OF THE INVENTION

The present invention relates generally to speech recognition and, more specifically, to editing recognized text using voice commands.

BACKGROUND OF THE INVENTION

Speech recognition is becoming more common in electronic devices. With a mobile terminal that has a multimodal interface, a visual phone display enhanced with speech recognition capabilities, not only can a user use voice commands to activate certain phone functions, the user can also input text, such as an SMS (short message service) entry, by dictation. Such a device uses either a local automatic speech recognition (ASR) engine to process the speech or sends the speech to a remote ASR engine residing in the network. The speech recognition engine for dictation usually uses a very large grammar that includes tens of thousands of words to allow for a reasonable range of content and scope for the dictated text. For example, the user may like to send a cooking recipe, or to express a political viewpoint.

It is quite common after dictation that the user would wish to edit the text as recognized and transcribed by the speech recognition engine, either to correct inaccurate recognition results or to make content changes. In general, a terminal device does not have a very large memory. The dictation and editing processes both require a very large grammar, rendering it impractical in a terminal device.

It should be noted that "vocabulary", as used in this disclosure, is referred to as a list of recognized words or phrases, and a subset of the vocabulary is referred to as "grammar". In addition to words and phrases, the grammar may contain editing rules and commands.

In a desktop or laptop electronic device, a pointing device such as a mouse, a joystick or a touch pad, is commonly used to locate the word or words in text to be edited. In the terminal device, such a pointing device may be impractical and is thus rarely provided. On a phone pad, arrow keys are typically provided for locating the letter in the text to be edited. However, moving the cursor to the editing location using arrow keys is slow and inconvenient. Thus, it is advantageous and desirable to provide a method and system for text editing using voice commands.

In order to avoid using a large grammar for speech recognition, Masters (U.S. Pat. No. 6,301,561) discloses a discrete speech recognition system for use in selecting radio stations, wherein a small default grammar having a small number of first tier words or utterances, each of which represents a subset of words or utterances of the second tier. Each of the second tier words or utterances represents a subset of words or utterances of the third tier, and so on. When one of the first tier words is selected by a user by voice, a plurality of words or utterances in the second tier subset represented by the selected first tier word are added to the grammar, thereby enlarging the grammar. When one of the second tier words is further selected by the user by voice, a plurality of words or utterances in the third tier subset represented by the selected second tier word are further added to the grammar, thereby further enlarging the grammar. The words or utterances of the second and third tiers are stored in a vocabulary that has a complete list of pre-defined utterances that are recognizable by a speech recognition engine. As such, the grammar that is actually used for carrying a function includes only a small portion of the pre-defined utterances in the vocabulary. While the speech recognition, as disclosed in Masters, is useful in reducing the time needed for speech recognition by keeping the grammar small, its usefulness is limited to a certain application, such as selecting radio stations, where a small set of pre-defined words or utterances identifies the cities and the broadcasting frequencies in a limited vocabulary are sufficient to suit the purposes. However, this type of limited vocabulary is usually insufficient for editing text, the scope and content of which is difficult to predict.

Thus, it is advantageous and desirable to provide a method and a system for text editing in a small electronic device where memory requirements do not allow a large grammar to be implemented in the device.

SUMMARY OF THE INVENTION

It is a primary objective of the present invention to provide a text editing method and system to be used in a hand-held electronic device where memory requirements do not allow a large grammar to be used for text editing and other speech recognition purposes. This objective can be achieved by using a small grammar in the device. While a large grammar is generally required for dictation, a small grammar yields a faster and more accurate result than the large grammar when the dictated text is edited. This small grammar initially includes a predefined set of command words. When a user dictates text for the first time, all dictated words are added to the small grammar. When the user ends dictation and starts editing, the small grammar is used. Only when words that are needed for editing cannot be found in the small grammar, a large grammar will be used. The device may also contain other sets of predefined words related to numbers, days of the week, months, names of contacts, and so forth that can be added to the small grammar when needed.

Furthermore, with the small grammar, a local ASR (automatic speech recognition) engine can be used in the device, and there is no need to send the voice data to a remote site or a mobile network during editing, except when new words are added. With a large grammar, remote ASR is more feasible.

Thus, according to the first aspect of the present invention, there is provided a method of modifying text in a hand-held electronic device in an editing session, the text including a plurality of third words, wherein at least a part of the text is dictated using a first grammar, the first grammar including a plurality of first words, and wherein the hand-held electronic device comprises a second grammar smaller than the first grammar, the second grammar including a plurality of second words for editing purposes. The method is characterized by providing the third words to the second grammar so that the second words include some or all of the third words.

Preferably, the second grammar includes a plurality of voice recognizable commands, and at least one of the voice recognizable commands can be activated in order to modify the text, and when the activated voice recognizable command specifies a text-modifying word for modifying the text, the text-modifying word is obtained from the second grammar if the text-modifying word is one of the second words, otherwise the text modifying word is obtained from the first words in the first grammar.

Advantageously, the text-modifying word obtained from the first words is included in the second grammar so that the second words further include said obtained word for further use.

Advantageously, the first words comprise a plurality of subsets of words associated with a plurality of classes, and the voice recognizable commands include a plurality of class commands for specifying the classes, wherein when the activated voice recognizable command includes one of the class commands, the subset of words associated with the class specified in said one class command is provided to the second grammar so as to allow the second words to further include said subset of words, and when the activated voice recognizable command further includes a different one of the class commands, a different subset of words associated with the class specified in said one different class command is provided to the second grammar so as to allow the second words to further include said different subset of words.

Preferably, when the activated voice recognizable command further includes the different one of the class commands, said subset of words is removed from the second grammar in order to reduce size of the second grammar.

Advantageously, the first grammar can be located in the hand-held electronic device or in a remote site operatively connected to the hand-held electronic device.

Advantageously, when the first grammar is located in the remote site, the hand-held electronic device further comprises a vocabulary for including the subsets of words associated with the plurality of classes.

Advantageously, the third words are associated with a plurality of word locations, and the voice recognizable commands include at least one location command for specifying the word location so as to modify the text based on the specified word location.

Preferably, the added words in the second grammar are removed when the editing session is terminated.

According to the second aspect of the present invention, there is provided a hand-held electronic device having modifiable text including a plurality of third words, wherein at least a part of the text is dictated using a first grammar, the first grammar including a plurality of first words. The device is characterized by:

a voice input module; and a memory module operatively connected to the voice input module, wherein the memory module comprises:

a second grammar including a plurality of second words and at least one of the third words, the second grammar smaller than the first grammar.

Advantageously, the memory module further comprises a plurality of voice recognizable commands which can be activated via the voice input module for modifying the text, wherein when the activated voice recognizable command specifies a text-modifying word for modifying the text, the text-modifying word is obtained from the second grammar if the text-modifying word is one of the second words, otherwise the text-modifying word is obtained from the first words in the first grammar.

Preferably, the second words further include the text modifying word obtained from the first words for further use.

The present invention will become apparent upon reading the description taken in conjunction with FIGS. 1 to 4b.

BRIEF DESCRIPTION OF THE INVENTION

FIG. 4b is a flowchart section illustrating some additional steps in the method of the present invention as shown FIG. 4a.

BEST MODE TO CARRY OUT THE INVENTION

Figure 1:
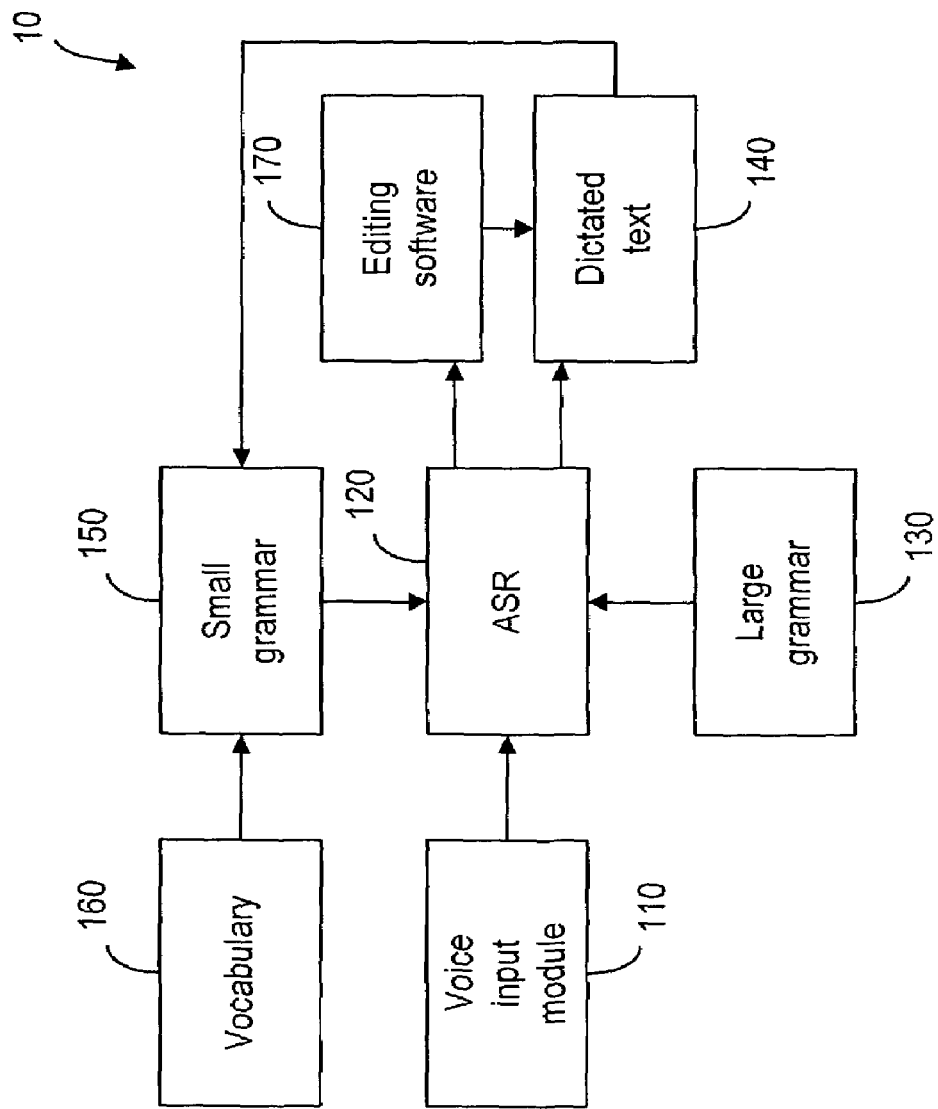
FIG. 1 is a block diagram illustrating an electronic device that has speech recognition and text editing capabilities, according to the present invention.

FIG. 1 is a block diagram illustrating an electronic device 10 that has speech recognition and text editing capabilities, according to the present invention. As shown the device 10 has a voice input module 110, allowing a user to dictate and edit text using voice commands. Speech input through the voice input module 110 can be handled locally or can be sent to a remote site or a network for speech recognition. As shown in FIG. 1, speech recognition is carried out in an automatic speech recognition (ASR) engine 120, which uses a large dictation grammar 130. The large dictation grammar 130 is usually loaded in the memory of the ASR engine 120. The recognition results or the recognized text 140 is typically displayed on the device 10 to allow a user to read and to edit if so desired. A small grammar 150 in a text format implemented in the device 10 initially includes only a set of dedicated editing commands, such as "Delete" and "Move" to initiate the editing process. When recognition results start to appear, all the words in the recognized text are added to the small grammar 150. This grammar grows cumulatively as the dictation proceeds.

If the user wants to edit the dictated text 140, the user may trigger an editing mode by using a special voice command or a keypad command. Alternatively, editing is a default mode. For illustration purposes, the dictated text 140 can be edited by using the following voice command sequence. Here "-" within the quotation marks denotes a short pause between utterances.

"Delete - very" to delete the word "very"

"Move - tomorrow - before - morning" to move the word "tomorrow" in front of the word "morning"

"Go before - year - Add - June" to add the word "June" before the word "year". If "June" is not yet in the small grammar 150, the large grammar 130 has to be used to recognize "June". The use of the large grammar 130 is triggered by the recognition of the "Add" command which calls for a text modifying word, such as "June", but not by other commands such as "Delete", "Move". The voice command "Add—June—before—year" could be used instead of "Go before - year - Add - June".

As shown in FIG. 1, the device 10 also comprises an editing software program 170, which uses the small grammar to edit the dictated text 140. However, the software program 170 can be a part of the small grammar 150 as described below.

Below is an example of the dynamically built grammar file in the JSGF (Java Speech Grammar Format). It represents the grammar file at a point where the user has dictated the sentence "This dictation is fun." The public rule <edit> is the main rule that the dictation application is using, consisting of the editing commands. The rules <place> and <word> are inner rules used in interpreting the rule <edit>. The rule <edit> has the options for deleting, moving and adding a word, and the rule <place> further defines the place where the editing should happen, by referring to the dictated words. The rule <word> is the changing part of the grammar, collecting all the recognized words of the dictation.

```
grammar edit;
public <edit> = delete <word>
    |   move <word> <place>
    |   go <place> add
    ;
<place> = (before | after) <word>
    ;
<word> = <NULL>          //Initially empty rule.
    | this               //First recognized word, added online.
    | dictation          //Second word, added when recognized
    | is                 //Lines added and deleted dynamically
    | fun                //when dictation proceeds.
    ;
```

The grammar file is again updated based on the commands that the user uses to edit the text. Once the dictation and editing session closes, the dynamically generated part of the grammar is removed and the grammar file will revert back to the original set, i.e., containing just the dedicated editing commands.

It is also possible to include in the device 10 a limited vocabulary 160 having a small number of pre-defined sets of words or phrases, such as words for "days of the week", words for "time of the day", numbers, alphabets, names in a contact list. As such, a specific set of words or phrases can be called out and added to the small grammar by a specific voice command. For example, the user can use the voice command "Activate - Days of the Week" to add "Sunday", "Monday", . . . into the small grammar 150 for editing purposes. This means that the growth of the small grammar is determined partly by the words that are needed for editing a certain dictated text. Only those words falling into certain categories called out by the "Activate" command will be added to the small grammar (see FIGS. 3a and 3b). The vocabulary 160 can be a part of the large grammar 130 if the large grammar resides in the electronic device 10.

Figure 2:
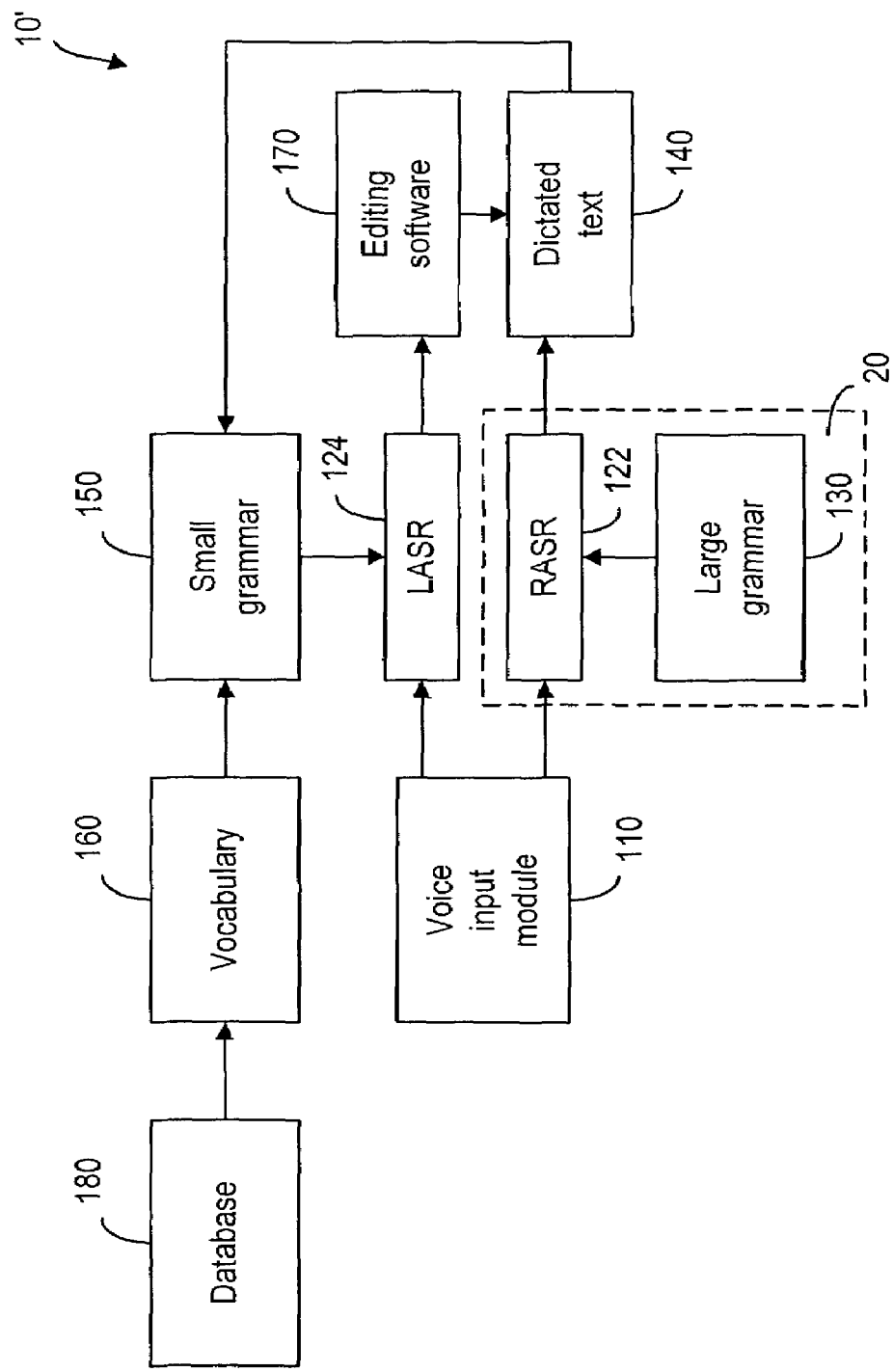
FIG. 2 is a block diagram illustrating an electronic device that has speech recognition and text editing capabilities, according to the best mode of the present invention.

If the electronic device 10' is a mobile terminal or the like, it is preferable to include a local ASR 124 in the mobile terminal for editing purposes, as shown in FIG. 2. When the user dictates a message, such as an SMS message, the user's speech is sent to a remote ASR 122 in the mobile network 20 for speech recognition using a large grammar 130. The recognition results are returned by the remote ASR 122 as dictated text 140. In addition to the basic edit command grammars residing in the small grammar 150, a set of standard grammars for standard usage like numbers, days of week, months of years, etc. are provided either in the small grammar 150 or in the vocabulary 160. It is also possible that the mobile terminal has a self-learning mechanism through which a list of names and phone numbers from the phone's contact database 180 is built and stored in the vocabulary 160 or in the small grammar 150. For editing purposes, the mobile terminal in the editing mode needs only to be linked to the network resident ASR 122 if the voice input contains words that cannot be found in the small grammar 150, or the vocabulary 160.

Because the mobile terminal or the like is limited in memory and processing power, it is preferred that only a limited set of grammars within the SMS dictation application be used during the edit phase. For the same reason, it may not be desirable to save the dynamically generated grammar in one SMS session for use in other later SMS sessions. Thus, it is preferred that once the dictation and editing session ends, the dynamically generated part of the grammar is removed from the small grammar 150, and that the grammar file reverts back to the original set, containing only the dedicated editing commands.

To illustrate the interaction between user and the active components in a mobile terminal, according to the present invention, an example of an SMS session is given below:

Entities: User, LASR (Local ASR), RASR (Remote ASR server)

Initial Steps:

User launches the SMS application. Using the soft keys, the user activates SMS Dictation. The SMS application is now multimodal capable and the user is allowed to input the text using both keypad and speech.

Editing Steps:

I. User: "I will be home at around 10.30 on Sunday"
  RASR: I will be home at around 10.30 on Sunday
  The LASR has now built a dynamic grammar that looks like <Session Gram>=I:will:be:home:at:around:10.30: on:Sunday
  User wants to edit the text that is now on display. He presses the Edit softkey.
II. User: GoTO 10.30
  Cursor is now positioned before "10.30".
III. User: Activate Time
  The time grammar (shipped with the phone) now becomes active. Now whatever the user says will be interpreted as time. If the user wanted to put in a number instead of time, he might say something like "Activate Number".
IV. User: change to 11.30
  Local ASR recognizes this based on the time grammar and substitutes "10.30" with "11.30".
V. User: GoTo Sunday
  Cursor is now positioned before "Sunday".
VI. User: Activate Days of week
  The "Days of Week" grammar is now active
VII. User: change to Saturday
  "Saturday" is now recognized by the local ASR and substitutes "Sunday".
VIII. User: SMS Home (signifying beginning of SMS)
  The cursor is now positioned before "I".
IX. User: Activate contacts
  Contacts grammar (built by the application using the resident contact database) becomes active.
X. User: Add Laura comma
  "Laura," gets added before "I".
  If the user doesn't activate any preloaded grammars, such as "Time", "Days of Week" etc., the network based ASR will be used for recognition.

Terminating Step:

Once the SMS has been completed, the user may send the SMS to one or more desired recipients use voice commands, regular keys on the keyboard or softkeys.

Figure 3A:
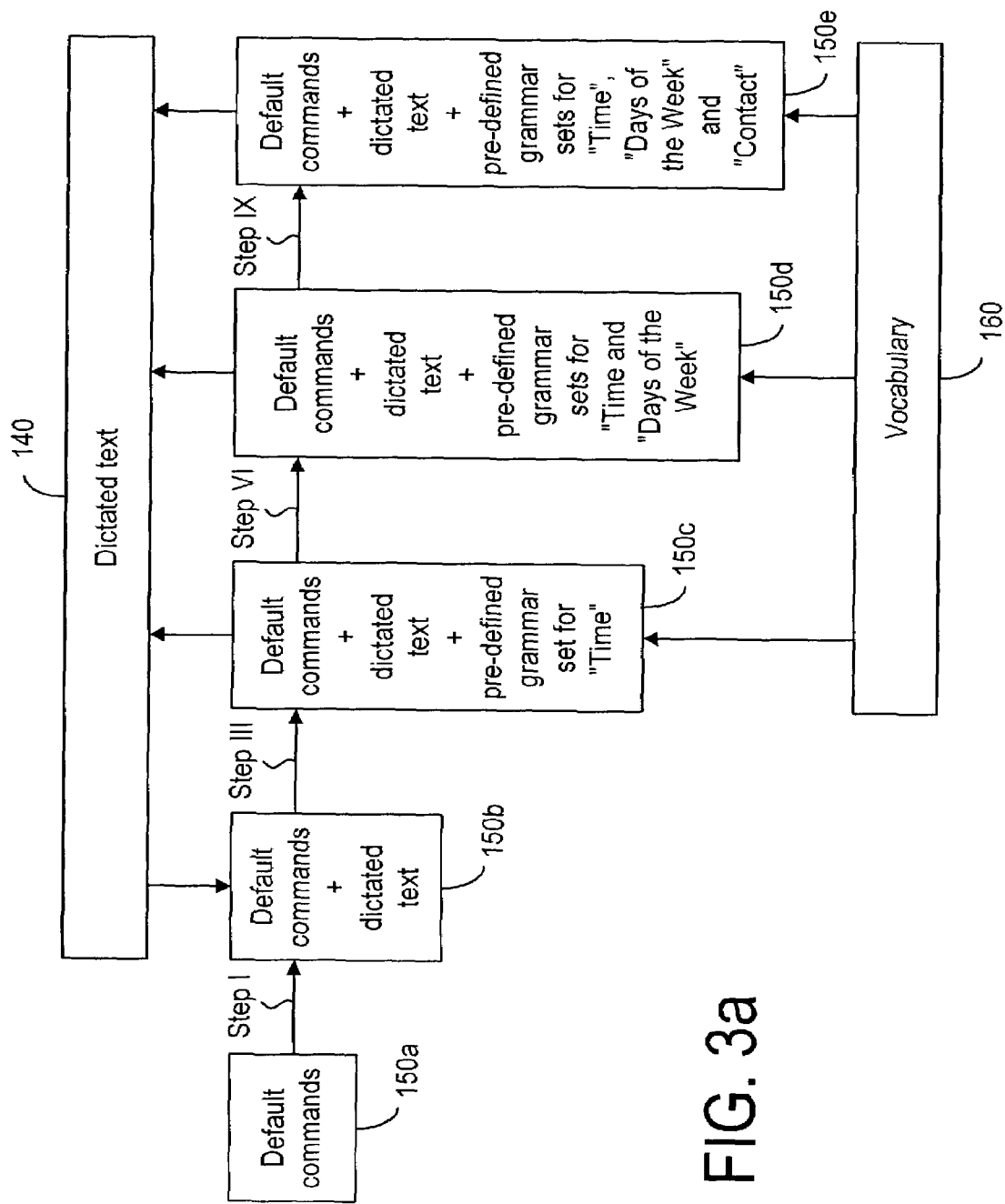
FIG. 3a is a block diagram illustrating the changes in the small grammar during text dictation and editing.
Figure 3B:
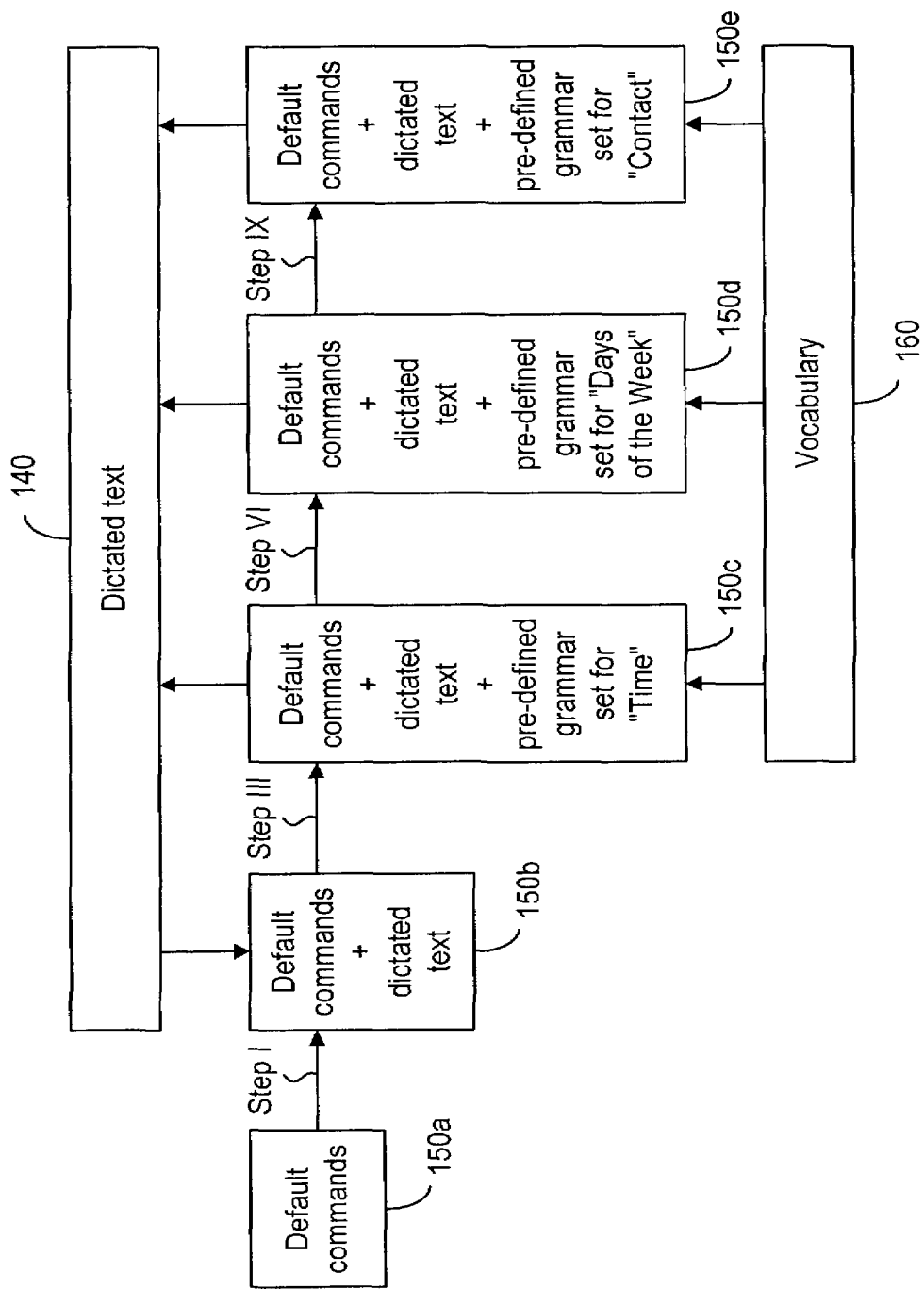
FIG. 3b is a block diagram illustrating a different version of the small grammar.

FIGS. 3a and 3b illustrate how the contents in the small grammar 150 grow during the editing process as described above. As shown in FIG. 3a, the small grammar 150a contains only a set of default commands, such as "Move", "Delete", "Activate", before dictation in the SMS session. After the user dictates the message at Step I and the recognized results returned to the terminal device 10', the small grammar 150b also includes the dictated text.

At Step II, the voice command "GoTO" does not call for a text modifying word that is not already included in the small grammar 150b. There is no need to add words to the small grammar at this step.

At Step III, the voice command "Activate" calls for at least one "Time" related word or utterance for modifying the dictated text. Accordingly, a pre-defined set of "Time" related words is added to the small grammar 150c.

At Steps IV and V, no new words are needed. Therefore, the small grammar does not grow.

At Step VI, the voice command "Activate" calls for at least one "Days of the Week"-related word or utterance for modifying the dictated text. Accordingly, a pre-defined set of "Days of the Week"-related words are added to the small grammar 150d.

Likewise, after Step IX, a pre-defined set of "contact" related words is added to the small grammar 150e.

When the editing session ends, the small grammar reverts to the original form 150a.

As can be seen in FIG. 3a, the small grammar grows cumulatively with the editing steps. This means the small grammar 150e is always larger than or at least equal to the small grammar 150d, which is always larger than or equal to the small grammar 150c. Alternatively, the pre-defined grammar set added to the small grammar responding to the need of a previous editing step can be removed in the small grammar when a new "Activate" voice command is used. As shown in FIG. 3b, at Step VI, the pre-defined set of "Time" related words is removed from the small grammar as a new pre-defined set of "Days of the Weeks"-related words are added to the small grammar 150d. Likewise, after Step IX, the small grammar 150e contains the pre-defined set of "Contact"-related words, but it no longer contains the words in the "Time" and "Days of the Week" sets. As such, the small grammar does not actually grow cumulatively, but rather grows dynamically according to the editing needs. The tradeoff with this approach is that the previously removed set has to be added to the small grammar again if the voice command calls for the text modifying words in that removed set.

Figure 4A:
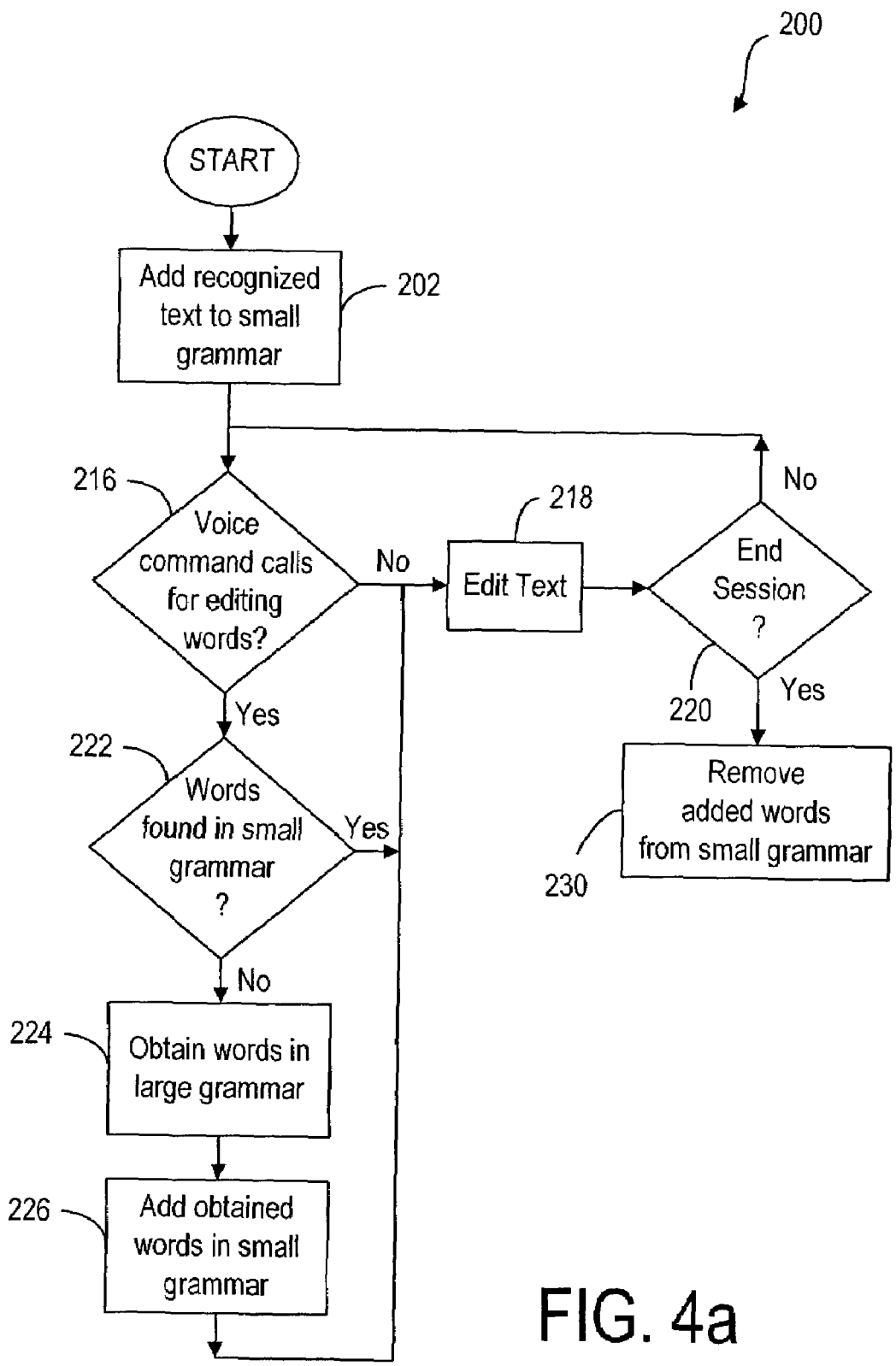
FIG. 4a is a flowchart illustrating the method of text editing, according to the present invention.
Figure 4B:
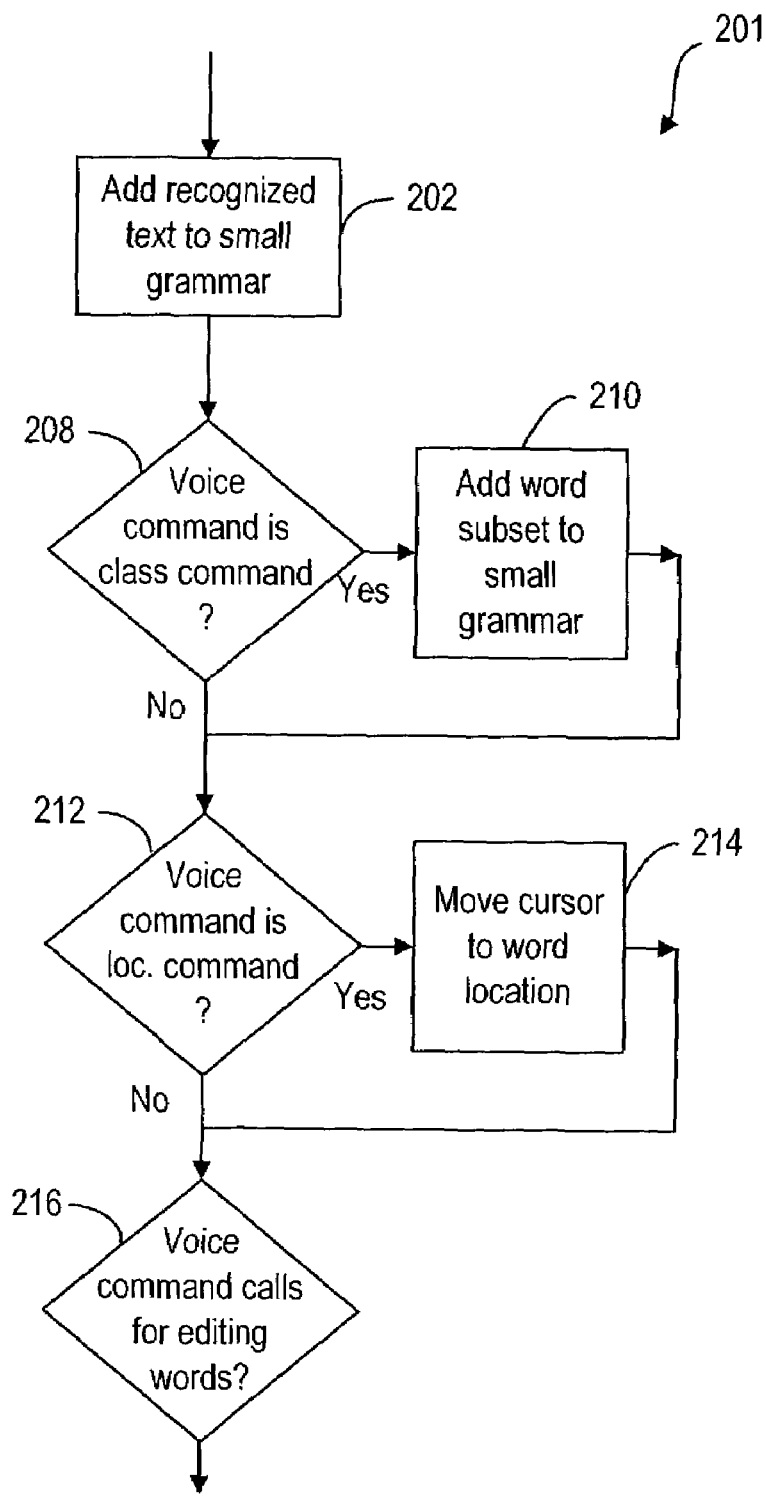

The method of text editing to be used in a hand-held electronic device, according to the present invention, is illustrated in the flowchart of FIGS. 4a and 4b. After the text is dictated, the recognized results are shown to the user. The user may decide whether to edit the text. If so, the editing session starts at step 202, as shown in the flowchart 200 of FIG. 4a. At step 202, the recognized text is added to the small grammar. When a user uses a voice command to modify the text at step 216, if the voice command, (such as "Move", "Delete", "GoTo") does not call for a text modifying word, then the dictated text is modified at step 218. If the editing session continues, then the procedure loops back to step 216. However, if the voice command (such as "Add", "Insert", "Spell") calls for one or more text modifying words (or numbers, alphabets) as decided at step 222, then the text modifying words in the small grammar will be used to modify the text at step 218. If the text modifying words cannot be found in the small grammar, the text-modifying words are obtained from the large grammar at step 224. The obtained words are added to the small grammar at step 226 and the dictated text is again modified at step 218. The process repeats itself until the user wants to end the editing session at step 220. At the end of the editing session, the small grammar is reset such that the added words, including the dictated text, are removed from the small grammar at step 230.

Advantageously, a number of steps can also be carried out in the editing session between step 202 and step 216, as shown in FIG. 4b. These steps are used to add more words to the small grammar for editing purposes. In particular, some of the words in the large grammar 130 or the vocabulary 160 can be put into a plurality of subsets of different classes. For example, the words "Monday", "Tuesday" . . . can be put into a subset related to a class called "Days of the Week". When the voice command (a class command) specifies a class, the subset of words associated with that class will be added to the small grammar. Furthermore, certain voice commands such as "GoTo", "Home", "Go before" are related to the location of the words in the text to be edited. These commands can be referred to as a location command. When an activated voice command is a location command, the cursor will move to the location specified in the location command. Thus, if the voice command is a class command, as determined at step 208, then a subset of words associated with the class specified in the class command is added to the small grammar at step 210. If the voice command is a location command, as determined at step 212, then the cursor is moved, at step 214, to the word location as specified in the location command.

In summary, the method of modifying text, according to the present invention, uses a dynamically generated small grammar for editing purposes. The method steps involve activating at least one of said voice recognizable commands in order to modify the text. When the activated voice recognizable command calls for one or more text modifying words, these words are obtained in the small grammar if found. Otherwise, these words are obtained from the large grammar. In a mobile terminal or a small hand-held electronic device where memory is limited, it is preferable to keep the large grammar at a remote site such as a mobile network. However, in an electronic device where memory is sufficiently large, it is possible to keep the large grammar in the device. In either case, the small grammar will be used for text editing unless the text modify words cannot be found in the small grammar.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of modifying text (140) in a hand-held electronic device (10) in an editing session, the text including a plurality of third words, wherein the hand-held electronic device comprises:

a speech recognition module for text editing, and a second grammar having a plurality of second words for editing purposes, wherein the hand-held electronic device has a communication link linking to a network component in a communication network, the network component comprising a first grammar having a plurality of first words, the second grammar smaller than the first grammar, wherein the second grammar includes a plurality of voice recognizable commands, and at least one of voice recognizable command can activated in order to modify the text, said method comprising:

dictating at least part of the text using the first grammar; and adding at least some of the third word words to the second grammar in the editing session so as to enlarging the second grammar for further use.

2. The method of claim 1, said method characterized in that when the activated voice recognizable command specifies a text-modifying word for modifying the text, the text-modifying word is obtained from the second grammar if the text-modifying word is one of the second words, otherwise the text modifying word is obtained from the first grammar.

3. The method of claim 2, further characterized by including in the second grammar the text-modifying word obtained from the first words so that the second words further include said obtained word for further use.

4. The method of claim 3, comprising the step of terminating the editing session, said method characterized by removing the obtained text-modifying word from the second grammar after said terminating step.

5. The method of claim 2, wherein the second grammar includes a plurality of voice recognizable commands, and at least one of the voice recognizable commands can be activated in order to modify the text, said method characterized in that the third words are associated with a plurality of word locations, and the voice recognizable commands include at least one location command for specifying the word location so as to modify the text using the text-modifying word at the specified word location in response to the activated voice recognizable command.

6. The method of claim 1, wherein the second grammar includes a plurality of voice recognizable commands, and at least one of the voice recognizable commands can be activated in order to modify the text, said method characterized in that the first words comprise a plurality of subsets of words associated with a plurality of classes, and the voice recognizable commands include at least one class command for specifying at least one of the classes, wherein when the activated voice recognizable command includes the class command, the subset of words associated with the class specified in the class command is provided to the second grammar, so as to allow the second words to further include said subset of words.

7. The method of claim 6, comprising the step of terminating the editing session, said method characterized by removing the subset of words from the second grammar after said terminating step.

8. The method of claim 1, wherein the second grammar includes a plurality of voice recognizable commands, and at least one of the voice recognizable commands can be activated in order to modify the text, said method characterized in that the first words comprise a plurality of subsets of words associated with a plurality of classes, and the voice recognizable commands include a plurality of class commands for specifying the classes, wherein when the activated voice recognizable command includes one of the class commands, the subset of words associated with the class specified in said one class command is provided to the second grammar so as to allow the second words to further include said subset of words, and when the activated voice recognizable command further includes a different one of the class commands, a different subset of words associated with the class specified in said one different class command is provided to the second grammar so as to allow the second words to further include said different subset of words.

9. The method of claim 8, further characterized in that when the activated voice recognizable command further includes the different one of the class commands, said subset of words is removed from the second grammar in order to reduce size of the second grammar.

10. The method of claim 1, wherein the hand-held electronic device (10) is operatively connected to a remote site (20), said method further characterized in that the first grammar is located in the remote site.

11. The method of claim 10, wherein the second grammar includes a plurality of voice recognizable commands, and at least one of the voice recognizable commands can be activated in order to modify the text, said method characterized in that the hand-held electronic device (10) further comprises a third grammar (160) including a plurality of subsets of words associated with a plurality of classes, and the voice recognizable commands include at least one class command for specifying at least one word to the classes, wherein when the activated voice recognizable command includes the class command, the subset of words associated with the class in the class command is provided to the second grammar so that the second words further include said subset of words.

12. The method of claim 11, comprising the step of terminating the editing session, said method characterized by removing the subset of words from the second grammar after said terminating step.

13. The method of claim 10, wherein the second grammar includes a plurality of voice recognizable commands, and at least one of the voice recognizable commands can be activated in order to modify the text, said method characterized in that the hand-held electronic device (10) further comprises a third grammar (160) including a plurality of subsets of words associated with a plurality of classes, and the voice recognizable commands include a plurality of class commands for specifying the classes, wherein when the activated voice recognizable command includes one of the class commands, the subset of words associated with the class specified in said one class command is provided to the second grammar so that the second words further include said subset of words, and when the activated voice recognizable command further includes a different one of the class commands, a different subset of words associated with the class specified in said one different class command is provided to the second grammar so that the second words further include said different subset of words.

14. The method of claim 13, further characterized in that when the activated voice recognizable command further includes the different one of the class commands, said subset of words is removed from the second grammar in order to reduce size of the second grammar.

15. The method of claim 1, wherein the second grammar includes a plurality of voice recognizable commands, and at least one of the voice recognizable commands can be activated in order to modify the text, said method characterized in that the third words are associated with a plurality of word locations, and the voice recognizable commands include at least one location command for specifying the word location, wherein when said at least one activated voice recognizable command includes the location command and identifies at least one of the third words to be replaced, the text-modifying word replaces said at least one identified third word based on the specified word location.

16. The method of claim 1, wherein the second grammar includes a plurality of voice recognizable commands, and at least one of the voice recognizable commands can be activated in order to modify the text, said method characterized in that the third words are associated with a plurality of word locations, and the voice recognizable commands include at least one location command for specifying the word location so as to delete at least one of the third words at the specified word location in responsive to the activated voice recognizable command.

17. The method of claim 1, comprising the step of terminating the editing session, said method characterized by removing the third words from the second grammar after said terminating step.

18. A hand-held electronic device (10) having a communication link linking to a network component of a communication network, the network component comprising a first grammar having plurality of first words, said electronic device comprising:

a memory module including a second grammar having a plurality second words for use in modifying text in a text editing session, the text including a plurality of third words, the second grammar smaller than the first grammar, wherein the memory module further comprises a plurality of voice recognizable command which can be activated via the voice input module for modifying text;

a speech recognition module; and a voice input module, operatively connected to the speech recognition module, for providing voice command for said text editing based on the text, wherein the text is dictated using at least one of the first grammar and the second grammar, wherein at least some of the third words are added to the memory module in the text editing session so as to enlarging the second grammar for further use.

19. The hand-held electronic device of claim 18, wherein the first grammar is included in the memory module.

20. The hand-held electronic device of claim 18, wherein when the activated voice recognizable command specifies a text-modifying word for modifying the text, the text-modifying word is obtained from the second grammar if the text-modifying word is one of the second words, otherwise the text-modifying word is obtain from the first grammar.

21. The hand-held electronic device of claim 20, wherein the second words further include the text modifying word obtained from the first words for further use.

22. The hand-held electronic device of claim 20, wherein the first grammar is located in a remote site, the remote site operatively connected to the hand-held electronic device so as to allow the text-modifying word to be obtained from the first words in the first grammar.

23. The hand-held electronic device of claim 22, further comprising a third grammar (160) including a plurality of subsets of words associated with a plurality of classes, wherein the voice recognizable commands include at least one class command for specifying at least one of the classes, and when the activated voice recognizable command includes the class command, the subset of words associated with the class specified in the class command is provided to the second grammar so that the second words further include said subset of words.

24. A software product comprising a computer readable medium for use in a hand-held electronic device, the computer readable medium having embedded therein pseudo-codes for use in modifying text in an editing session, the text including a plurality of third words, wherein at least a part of the text is dictated using the first grammar located in a network component having a communication link linking to the hand-held device, the first grammar including a plurality of first words, and wherein the hand-held electronic device comprises a memory module for storing a second grammar having a plurality of second words for text editing purposes, the second grammar smaller than the first grammar, wherein the second grammar includes a plurality of voice recognizable commands, and at least one of the voice recognizable commands can be activated in order to modify the text such that the activated voice recognizable command specifies a text-modifying word for modifying the text, said pseudo codes adapted to carry out the steps of:

extracting at least some of the third words in the editing session; and adding the extracted third words to the memory module so as to enlarge the second grammar for further use.

25. The software product of claim 24, the software product further characterized in that the pseudo codes are also adapted to carry out the step of:

obtaining the text-modifying word from the second grammar if the text modifying word is one of the second words, otherwise obtaining the text-modifying word for the first words in the first grammar.

26. The software product of claim 25, further characterized in that the pseudo codes are also adapted to carry out the step of:

adding the text modifying text obtained from the first words in the first grammar to the memory module to further enlarge the second grammar for further use.

27. The software product of claim 24, wherein the second grammar includes a plurality of voice recognizable commands, and at least one of the voice recognizable commands can be activated in order to modify the text, and the first words comprise a plurality of subsets of words associated with a plurality of classes, and the voice recognizable commands include at least one class command for specifying at least one of the classes, said software product further characterized in that the pseudo codes are also adapted to carry out the step of:

adding the subset of words associated with the class specified in the class command to the memory module when the activated voice recognizable command includes the class command so as to further enlarge the second grammar for further use.

28. The software product of claim 24, wherein the second grammar includes a plurality of voice recognizable commands, and at least one of the voice recognizable commands can be activated in order to modify the text, and the first words comprise a plurality of subsets of words associated with a plurality of classes, and the voice recognizable commands include a plurality of class commands for specifying the classes, said software product further characterized in that the pseudo codes are also adapted to carry out the step of:

adding the subset of words associated with the class specified in said one class command to the memory module when the activated voice recognizable command includes one of the class commands so as to enlarge the second grammar for further use; and adding a different subset of words associated with the class specified in a different one of the class commands to the memory module when the activated voice recognizable command further includes said different one of the class commands so as to enlarge the second grammar for further use.

29. The software product of claim 28, further characterized in that the pseudo codes are also adapted to carry out the step of:

removing said subset of words from the memory module when the activated voice recognizable command further includes the different one of the class commands so as to reduce size of the second grammar.

30. The software product of claim 24, wherein the second grammar includes a plurality of voice recognizable commands, and at least one of the voice recognizable commands can be activated in order to modify the text, and wherein the third words are associated with a plurality of word locations, and the voice recognizable commands include at least one location command for specifying the word location, and said at least one activated voice recognizable command includes the location command and identifies at least one of the third words to be replaced, said software product further characterized in that the pseudo codes are also adapted to carry out the step of:

replacing in the second grammar said at least one identified third word with the text-modifying word based on the specified word location.

* * * * *